United States Patent [19]

Andrieu et al.

[11] Patent Number: 4,872,013
[45] Date of Patent: Oct. 3, 1989

[54] METHOD AND DEVICE FOR THE SLANT RANGE CORRECTION OF A SHORT-RANGE RADAR

[75] Inventors: Jean P. Andrieu, Paris; Dominique Gault, Ville D'Avray; Jean C. Henri, Boulogne Billancourt, all of France

[73] Assignee: Thomson-CSF-S.C.P.I., Paris, France

[21] Appl. No.: 58,570

[22] Filed: Jun. 5, 1987

[30] Foreign Application Priority Data

Jun. 17, 1986 [FR] France ............................ 86 08719

[51] Int. Cl.$^4$ .............................................. G01S 13/08
[52] U.S. Cl. ....................................... 342/135; 342/36; 342/176
[58] Field of Search ........ 342/118, 119, 135, 120–122, 342/133, 139, 146, 165, 173, 174, 401, 458, 175, 176, 184, 36

[56] References Cited

U.S. PATENT DOCUMENTS

| | | | |
|---|---|---|---|
| 2,624,509 | 1/1953 | Chance et al. | 235/414 |
| 4,185,288 | 1/1980 | Dosch et al. | 343/765 |
| 4,213,126 | 7/1980 | Mulder et al. | 342/36 |
| 4,232,380 | 11/1980 | Caron et al. | 367/88 |
| 4,281,327 | 7/1981 | Frazier et al. | 342/135 |
| 4,445,186 | 4/1984 | Caron et al. | 364/521 |
| 4,752,824 | 6/1988 | Moore | 358/103 |

FOREIGN PATENT DOCUMENTS

| | | |
|---|---|---|
| 0067316 | 5/1982 | European Pat. Off. . |
| 2425708 | 1/1975 | Fed. Rep. of Germany . |
| 1558469 | 1/1980 | United Kingdom . |
| 1564169 | 4/1980 | United Kingdom . |

OTHER PUBLICATIONS

Anuta et al., Time BASE FUNCTION GENERATOR, IBM Technical Disclosure Bulletin, vol. 7, No. 6, Nov. 1964.
Seisakusho et al., RETIMING DISPLAY RADAR EQUIPMENT, Patent Abstracts of Japan, vol. 8, No. 159, p. 289, Jul. 24, 1984.

Primary Examiner—Thomas H. Tarcza
Assistant Examiner—Bernarr Earl Gregory
Attorney, Agent, or Firm—Marmorek, Guttman & Rubenstein

[57] ABSTRACT

The method consists mainly in re-creating, from an incoming radar recurrence (R, R'), a corrected recurrence ($R_c$, $R'_c$) that has the same characteristics (notably the same sampling frequency and number of samples) but with the samples re-positioned temporally to make the necessary range correction.

10 Claims, 6 Drawing Sheets

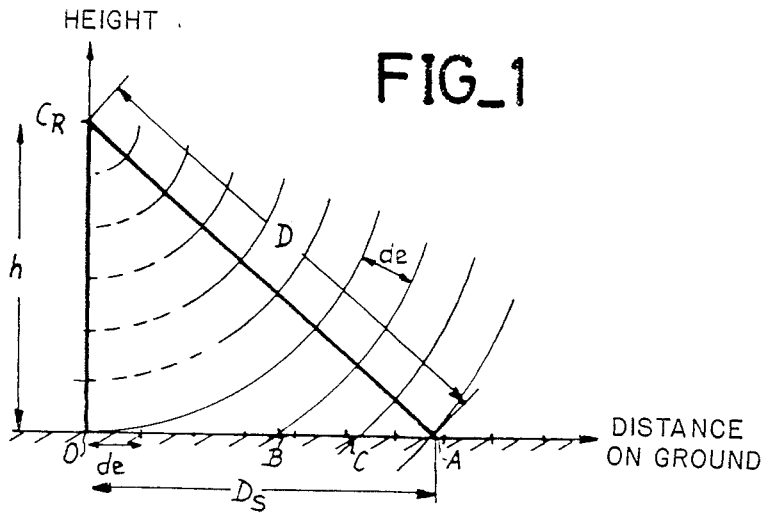
FIG_1
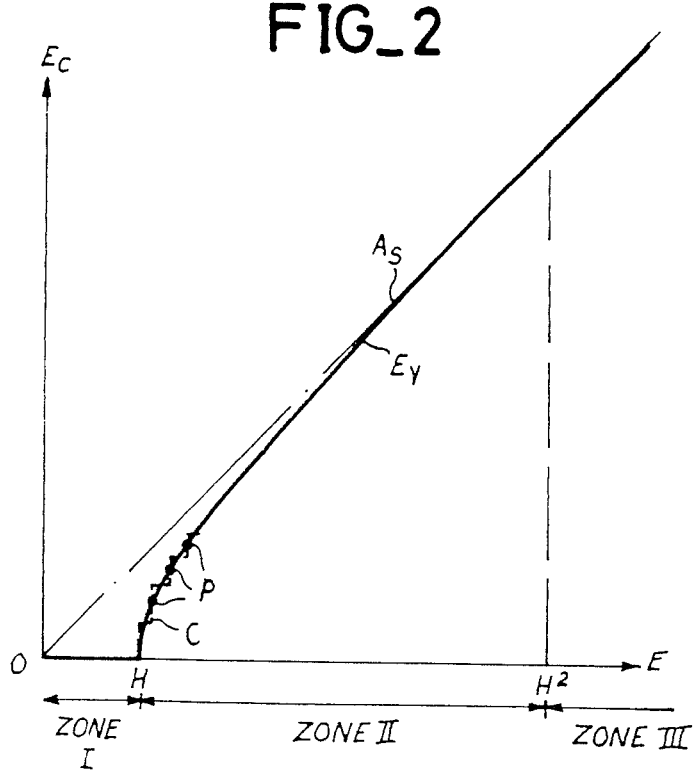
FIG_2

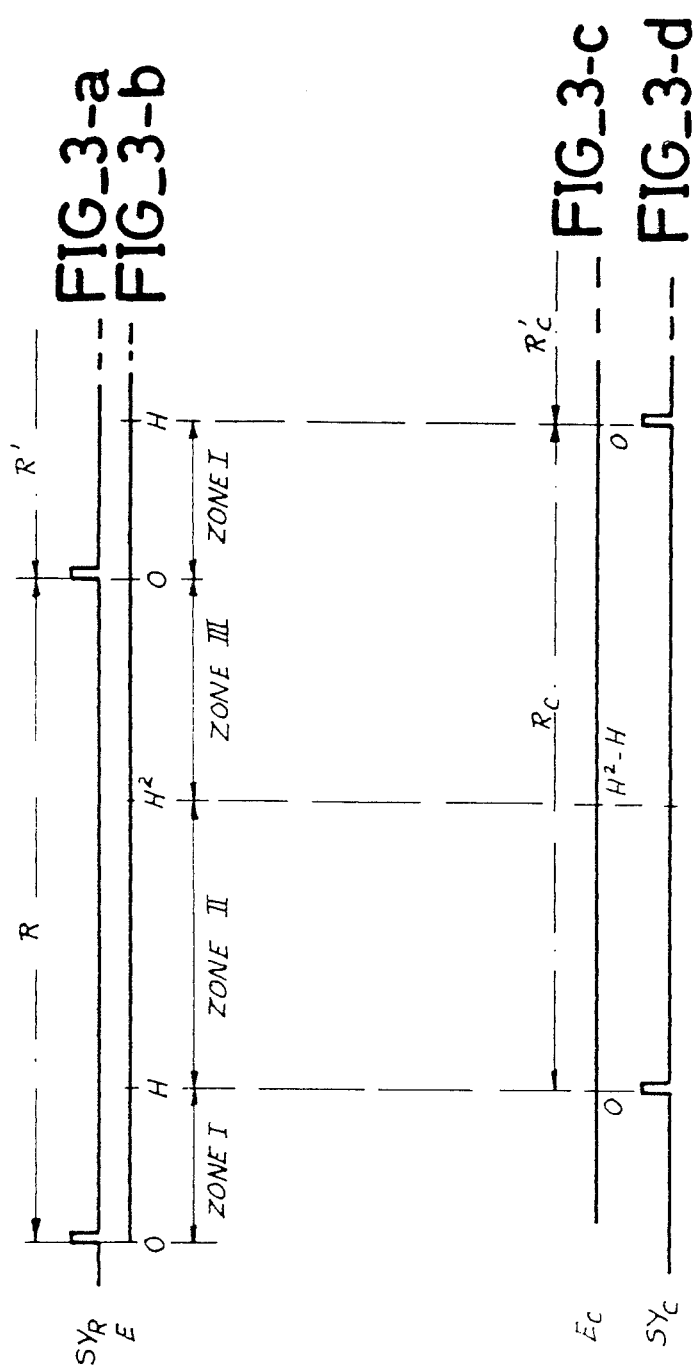

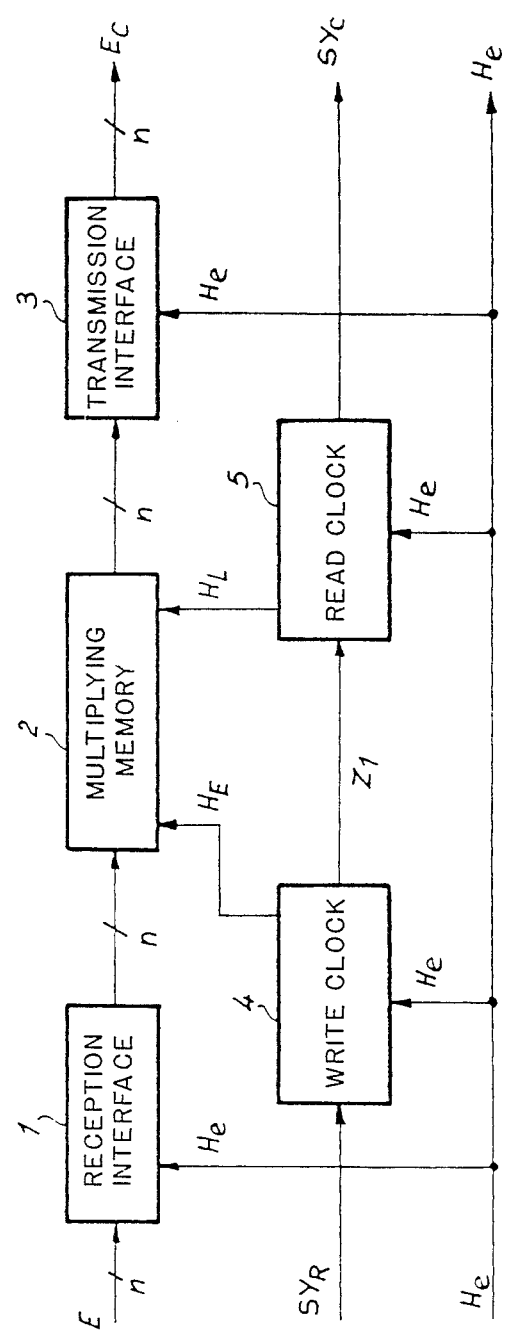

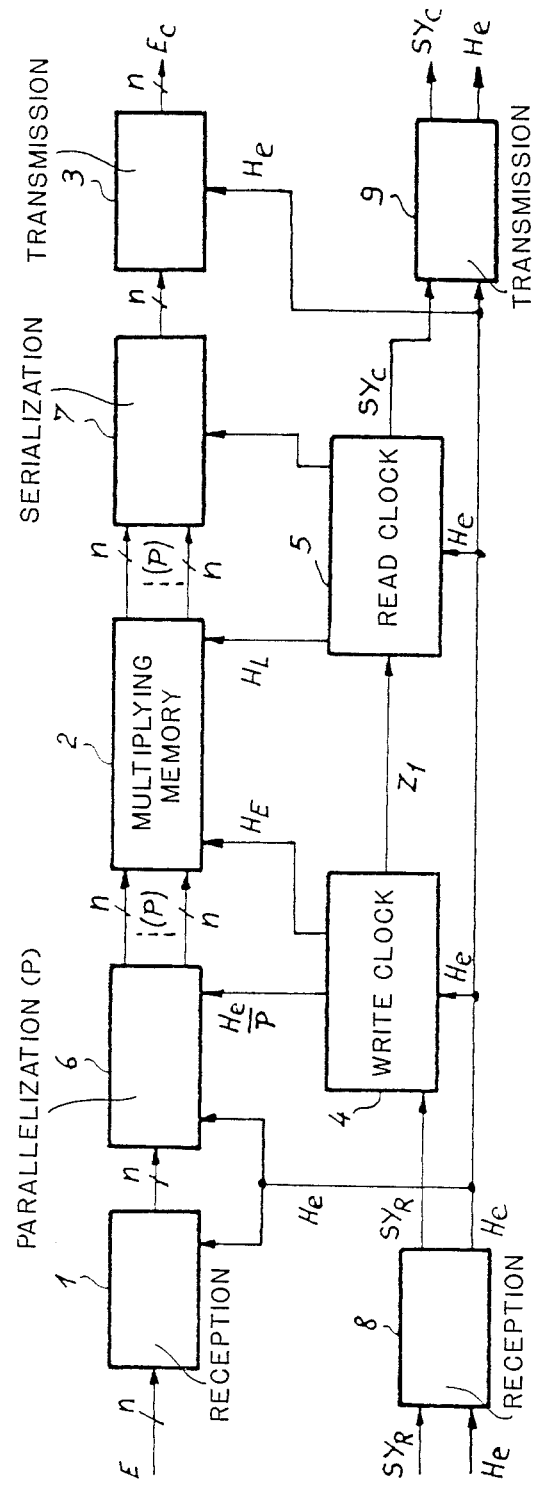
FIG_5

FIG_6
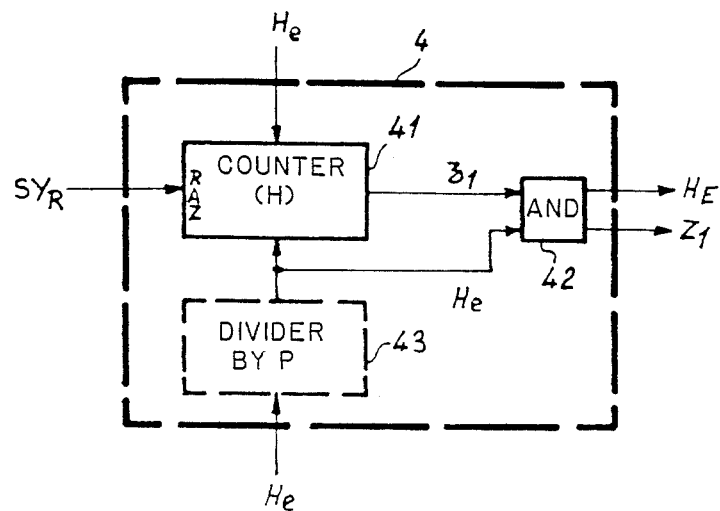
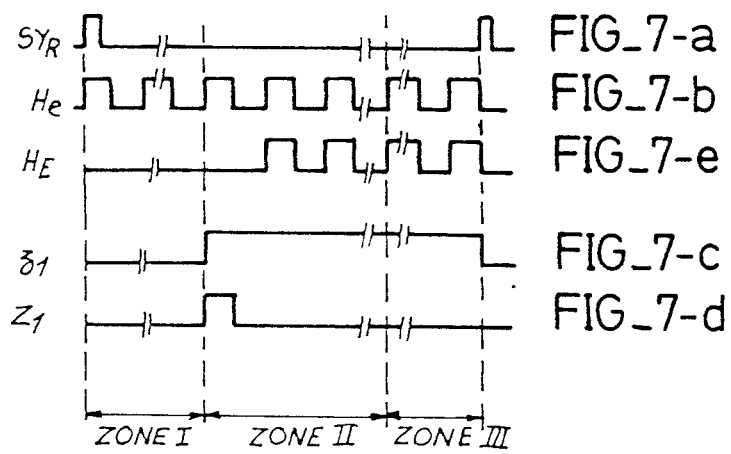

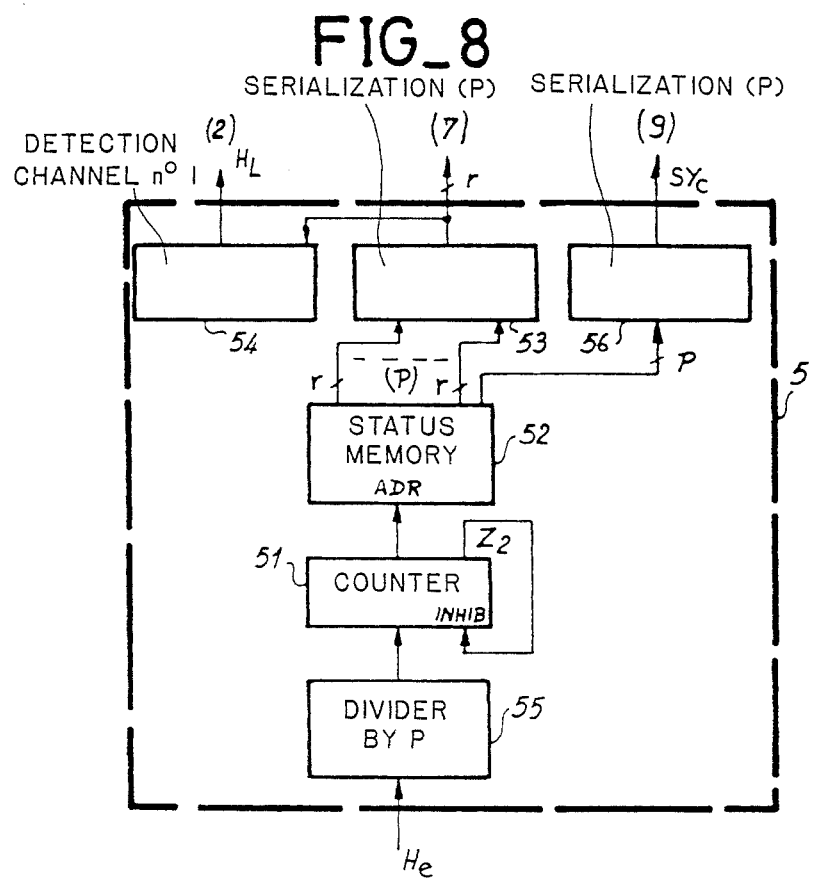
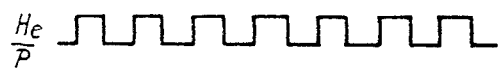
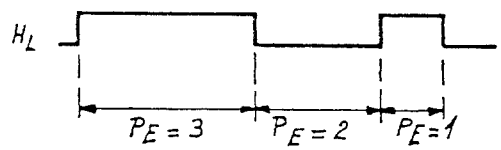

METHOD AND DEVICE FOR THE SLANT RANGE CORRECTION OF A SHORT-RANGE RADAR

BACKGROUND OF THE INVENTION

1. Field of the Invention

The object of the present invention is a method and a device for the slant-range correction a short-range radar.

2. Description of the Prior Art

As is known, a radar transmits cycles of pulse signals which are reflected by surrounding obstacles and return to the radar transmitter. On reception, the radar receives a signal called a video signal, consisting of a succession of signals of the same duration, called recurrences, each recurrence consisting of all the echos received in response to a transmitted pulse signal. After processing, the video signal is displayed on a screen. The range (D) of a moving object with respect to the radar center is proportionate to the time (t) taken by this pulse to return:

$$D = \frac{c \cdot t}{2},$$

with c, the speed of the electromagnetic waves. In general, the video signal is sampled and digitalized. The distance D is then given by:

$$D = E \cdot \frac{c \cdot Te}{2} \qquad (1)$$

where E is the number of samples from the beginning of the recurrence or, again, the sequence number of the sample if these samples are numbered sequentially from the beginning of the recurrence, and Te is the sampling period.

Certain radars are used to monitor air traffic at an airport (especially the traffic of aircraft on the ground) or again, traffic in a harbour, i.e. they are used to monitor traffic in zones close to the radar center. In this type of application, the radar must be at a raised level, so that its monitoring function is not hampered by land obstacles: it is placed then on a tower, the height of which may be about a hundred meters. The range measurements made by the radar are obviously done with respect to the radar center, whereas only the ground projections of these distances are useful: the ranges measured must therefore be corrected to express them with reference to the foot of the tower. If this is not done, there is a resulting error in the positioning of the echos which is equal, at the maximum, to the height of the tower. Furthermore, the radar echos are displayed on a screen which generally has a map of the ground infrastructures (landing strips, taxiways, etc.) superimposed on it. The above positioning error then results in a lack of coincidence between the radar video and the map, which is quite detrimental to the efficient monitoring of the zone considered.

Various methods can be used to cope with this lack of coincidence.

One of these methods of the prior art entails the drawing up of a special map of the installations on the ground in relation to the radar center by using, for example, a reflector on a vehicle which travels through the various strips of the airport. This is a cumbersome method to use: the maps must be specially made and conventional cartographic surveys cannot be used. Furthermore, this method can be used only to superimpose the map so that it precisely matches the radar video, and any additional information displayed on the screen, for example an indication of scale, must also be corrected.

Another method is to make the correction with respect to the very notion of the distance associated with a given sample: in this method, a sample is no longer taken to represent a constant elementary increment in distance but is associated with a distance datum which must be calculated according to the sequence number of this sample (hence, to the relative position of the obstacle with reference to the radar center). This method is fairly cumbersome to use and has the disadvantage of being unusable in existing installations unless they are physically altered.

SUMMARY OF THE INVENTION

The present invention can be used to make a correction to display the real distance, thus making it compatible with existing cartographic surveys while at the same time keeping it simple and compatible with existing upstream and downstream processing facilities.

The invention consists in using an incoming radar recurrence to re-create a corrected recurrence with the same characteristics (notably as regards sampling frequency, range, duration and number of samples), but the sample of which are temporally re-positioned so as to make a range correction A structure of this type presents the advantage of having no effect whatsoever on upstream devices (for example, the radar receiver for example) and downstream devices (for example, the radar signal processing, image digital transformer and display devices for example).

This structure therefore has an optional character which gives it an additional advantage.

BRIEF DESCRIPTION OF THE DRAWINGS

Other objects, specific features and results of the invention will emerge from the following description which is given as a non-exhaustive example and illustrated by the appended figures, of which:

FIG. 1 is a diagram illustrating the error introduced into the measurement of distances by the fact that the radar is set on a tower;

FIG. 2 is an explanatory curve;

FIGS. 3a to 3d are timing graphs showing the correction method according to the invention;

FIG. 4 is a block diagram of a first embodiment of the device according to the invention;

FIG. 5 is a block diagram of a second embodiment of the device according to the invention;

FIG. 6 is the diagram of an element used in the device according to the invention;

FIG. 7a to 7e are graphs of signals pertaining to FIG. 6;

FIG. 8 is the diagram of another element used in the device according to the invention;

FIGS. 9a and 9b are graphs of signals pertaining to FIG. 8.

DESCRIPTION OF THE DISCLOSED EMBODIMENTS

FIG. 1 illustrates the error introduced into the measurement of distances by the fact that the radar is placed on a tower.

In this figure, the radar center, $C_R$ is placed on a tower with a height h. A is a moving object on the ground for which the radar must measure the range $D_S$ from the foot (O) of the tower, taken as the origin of the coordinates.

In fact, the radar measures the slant range D between the points $C_R$ and A.

As stated above, the video signal received by the radar is sampled and each sample corresponds to an increment of distance (or elementary distance) $d_e$; FIG. 1 shows the E elementary distances $d_e$ forming the range D by E concentric circles (center $C_R$).

We therefore get:

$$D = E \cdot d_e \quad (2)$$

with:

$$d_e = \frac{c \cdot Te}{2} \quad (3)$$

which is equivalent to the above expression (1).

The height h of the tower can also be expressed as a function of $d_e$:

$$h = H \cdot d_e \quad (4)$$

H being a number of elementary distances $d_e$.

The distance to the ground $D_S$ can be written:

$$D_S = \sqrt{D^2 - h^2}$$

or, in relation to the expressions (2) and (4):

$$D_S = d_e \cdot \sqrt{E^2 - H^2}$$

According to the invention, a quantity $D_{sol}$, which is a whole number ($E_c$) of the elementary distances $d_e$, is taken as the distance of the moving object A from the ground, $E_c$ being such that $D_{sol}$ is the best possible approximation of $D_S$. This can be written:

$$E_c = q(\sqrt{E^2 - H^2}) \quad (5)$$

where q(u) is a law of quantification defined by:

$$u \in \,]n-0.5; n+0.5]; q(u) = n,$$

n being a positive integer.

Other laws can, of course, be considered such as the one where the interval $]n-0.5; n+0.5]$ is replaced by $]n; n+1]$.

FIG. 2 shows the curve of the variation of the corrected number of samples ($E_c$) as a function of the non-corrected number (E) as given by the expression (5) above.

This figure shows the envelope $E_V$ of this curve, its asymptote $A_S$ ($E_c = E$) and a part of the curve C corresponding to the expression (5), which is in fact a succession of points p.

This curve has three zones.

In the first zone (zone I), where E is smaller than H, the distance of any echos from the radar center is smaller than the height of the tower. They therefore cannot be echos coming from the motions of moving objects on the ground, and are hence not taken into account.

In the second zone (zone II) where E ranges between H and $H_2$ the corrected samples $E_c$ are obtained by multiplying the samples E by a factor $P_E$. The factor $P_E$ is variable and depends on E. It must be noted that the number of samples created by multiplication in this zone is equal to the number (H) of points that are not taken into account in the previous zone.

In the third zone (zone III), where E is greater than $H^2$, it is considered that the curve can be identified with its asymptote and we therefore get $E_c = E$; there is no correction. For the correction necessary is big only near the radar center $C_R$ and can be overlooked at a certain distance from it (chosen as being equal to $E = H^2$).

Thus it would appear that the mean flowrate of input data is equal to the mean flowrate of output data.

However, a shift appears. This shift is shown in the FIGS. 3a to 3d.

The graph 3a shows the radar synchronization signal $S_{YR}$ which consists of a cyclical succession of pulses defining the successive recurrences (R, R').

The graph 3b shows the notable values, O, H, $H^2$ of the samples E according to time, which define the zones I, II and III.

The graph 3c shows the corrected samples $E_c$ according to time they start (value 0) at the beginning of zone I and can continue beyond the recurrence R, until the end of the following recurrence R'.

The graph 3d shows the correction that must then be made to be radar synchronizing signal $SY_R$, which becomes $SY_c$: the starting pulse of the corrected recurrence (noted $R_c$, $R'_c$) occurs at the start of zone II, but since the duration of the recurrence is maintained, it ends at the beginning of zone II of the following radar recurrence (R'). It appears therefore that, with this method, a corrected recurrence with the same duration and the same number of samples is re-created from an incoming radar recurrence, this corrected recurrence, however, having its samples re-positioned temporally in order to make the desired range correction.

It must be noted, however, that the delay introduced between $SY_R$ and $SY_c$ must also be introduced into the antenna rotation signals (the north signal and the angle increment signal) so that the correction made continues to have no effect on the assignment of recurrences to the radials.

It must also be noted that it is necessary to multiply samples in zone II because of the appearance of the image displayed: for a sample E represents an elementary distance at the ground (for example segment BC in FIG. 1) which is greater than $d_e$: if the samples E were just re-positioned without multiplication, the image obtained would have a "moth-eaten" appearance.

FIG. 4 describes an embodiment of a device for the application of the above method.

This device comprises mainly a receiver interface 1, a set 2 that multiplies the samples (this operation being done in this example by a memory) a transmission interface 3, a generator 4 of a clock signal input in the set 2 and a generator 5 of a clock signal output from the same set 2.

The receiver interface 1 receives the incoming radar video samples E, for example, in parallel on n bits, and shapes them under the control of the sampling frequency He in order to make them acceptable for the set 2.

In this embodiment, certain samples are multiplied by a factor $P_E$ by memorizing the incoming samples and by subsequently reading them the number of times ($P_E$) desired. Since it is sought to have the same rate (He) for the samples E at the input as for the corrected samples $E_c$ at the output of the device, the invention provides for memorizing the samples as and when they arrive, and they are read at a lower rate, corresponding to the multiplying factor $P_E$ sought; each of these samples, read at a slower rate, is then re-transmitted several times at the rate He. The memorizing must therefore be done by a device that provides for simultaneous and mutually independent writing and reading. A memory of the FIFO type is suitable for this purpose.

The incoming samples are therefore recorded at the rate of their arrival in the memory 2, except for the samples corresponding to the zone I. For this purpose, the recording in the memory 2 is controlled by a clock signal $H_E$ generated by the set 4. This set 4 is described below with reference to FIG. 6.

These samples are re-read at a slower rate, reference $H_L$, given by the set 5 for which one embodiment is shown in FIG. 8. The set 5 also generates the corrected synchronizing signal $SY_c$.

The samples read at the rate $H_L$ are transmitted, for example, also in parallel on bits, to the transmission interface 3 which shapes them and transmits them at the rate He, identical to the rate of the incoming samples E. To this end, it memorizes the samples as and when they are received (at the rate $H_L$) by means of D type flip-flops for example, and transmits this memorized data at the rate He. As a result, when the frequency $H_L$ is lower than the frequency He, the same sample is transmitted several times ($P_E$ times), i.e. multiplied by $P_E$.

FIG. 5 shows another embodiment of the device according to the invention, which makes it possible to use memories with a lower operating frequency to make the memory 2. For this purpose, in FIG. 5 the device of FIG. 4 is made parallel by a factor P at the memory 2.

More precisely, the device of FIG. 5 comprises elements similar to those of FIG. 4, to which a circuit 6 has been added between the blocks 1 and 2, this circuit 6 placing the incoming samples E in parallel by a factor P, and receiving, for this purpose, the clock signal He as well as a signal He/P. Correlatively, a multiplexer set 7 has been added, providing for the serialization of samples received in parallel on P channels of the memory 2, under the control of the set 5.

As an example, the samples are placed in parallel by a factor P by means of P channels that receive the samples E in parallel, the channel with the sequence number i (i varying between 1 and P) comprising i-1 D type flip-flops in series. This embodiment is well suited to parallelization by two (P=2). When P becomes greater, it is simpler to use a shift register for example.

The figure further shows two sets 8 and 9 which respectively receive and transmit the clock ($H_e$) and radar synchronizing ($SY_R$ and $SY_c$) signals in a way similar to that of the sets 1 and 3 for the samples E and $E_c$.

FIG. 6 shows an embodiment of the set 4 that generates a write clock signal $H_E$. This figure is described below in connection with the FIGS. 7a to 7e which show the development in time of various signals received or transmitted by the set 4.

The set 4 comprises a counter 41 receiving the sampling signal He, which is shown in the graph 7b. The function of the counter 41 is to count up to the value H which, it will be recalled, is the number of samples corresponding to the height at which the radar center is placed. The output signal $z_1$ of the counter 41, illustrated by the graph 7c, is therefore nil throughout the duration of the zone I and then at the high level during the two other zones.

The set 4 further comprises a logic circuit 42 which mainly performs an AND type of function This set 4 receives the signal $z_1$ and the clock signal He and delivers the write clock signal $H_E$ illustrated by the graph 7e: this signal is therefore identical to the signal He except in the zone I (plus one cycle in this embodiment) where it is nil. Thus, writing in the memory 2 is inhibited in the zone I. The circuit 42 further produces a pulse, $Z_1$, to detect the rising edge of the signal $z_1$ shown in the graph 7d.

Furthermore, the counter 41 is zeroized by the radar synchronizing pulse $SY_R$, illustrated in the graph 7a, so that the following recurrence can be processed.

Finally, dotted lines 43 show a divider by P, interposed between the reception of the sampling signal He and the input of the counter 41, used in the example of FIG. 5 to take into account the parallelism (P) made at the set 1. In this case, the signal received by the AND gate 42 is not the signal He but the output signal of the divider 43. It must be noted that, in the case of the FIG. 5, since the sets 4 and 5 both need the signal He/P, the division can be done only once, upstream of these sets.

FIG. 8 shows an embodiment of the set 5 which generates the read clock signal $H_L$ of the memory 2, as an example in the particular case of FIG. 5. This figure is described below in relation with the FIGS. 9a and 9b which show the development in time of various signals received or generated by the set 5.

The function of the set 5 is therefore to generate the read signal ($H_L$) of the memory 2. For this purpose, it should therefore contain the values of the factor ($P_E$) by which the samples should be multiplied. These values are contained in a memory (52) called a status memory.

The speed of this status memory can be smaller than that which would be required by the rate ($H_e$) of the samples. It is therefore possible to achieve parallelization at this level by a factor Q as has been described above (FIG. 5) for parallelization at the level of the memory 2 by a factor P. In practice, taking Q=P proves to be very convenient: this is the mode of embodiment described in FIG. 8.

The set 5 thus receives the clock signal He. This frequency He is divided by the degree of parallelism P by a divider 55; the frequency He/P is shown in the graph 9a. It is then given to a counter 51 which has the function of successively addressing the words of the status memory 52 at the rate of the sampling clock divided by P. This memory contains words of P×r bits with 2r=P. At the end of the zone II, the counter 51 transmits an end-of-count signal $Z_2$ which is applied to the said counter at an inhibition input (INHIB) The effect of this is the permanent addressing of the last word of the memory 52 which corresponds to the entire zone III, namely:

$H_L$=He/P.

The bits intended for the set 7 are serialized on r bits by means of a multiplexer 53, which thus sequentially selects one of the P channels available at the output of the memory 2. The read clock signal $H_L$ is generated by the device 54 which detects the selection of the channel No. 1 from among the P channels available at the output of the memory 2.

Furthermore, it is convenient to add, to each of the words of the status memory (P×r bits), a word of P×1 bits giving the P successive statuses of the corrected radar synchronizing signal $SY_c$. This word, which is read at the same time as the channel numbers, is serialized by a multiplexer 56 to form the signal $SY_c$ intended for the set 9.

In the particular case where P=2, r=1, it is convenient to associate, for example, the top status of the output of the status memory with the selection of the samples of one of the channels (e.g. channel no 1) and the bottom status with that of the samples of the other channel (channel no 2). Thus FIG. 9b illustrates an example of the signal $H_L$ as a function of time. In this example, the first sample of channel no 1 is repeated thrice (factor $P_E=3$), and the following sample of channel no 2 is multiplied only twice. For the following pair of samples, again as an example, the first sample is multiplied only once etc. In other words, signal $H_L$ constitutes a coding of channel no 1: when said signal $H_L$ is on top status, channel no 1 is concerned. In this case, the detection device 54 is not necessary.

Of course, the invention is not limited to the example described. In particular, the scope of the invention covers a correction to obtain the projection of the range measured by the radar on a plane other than the horizontal plane, passing through the moving object detected.

What is claimed is:

1. A method for the slant range correction of a radar, said radar giving a so-called slant measurement of the range (D) between its center ($C_r$) and a moving object (A), said method comprising the steps of
   providing from said radar a periodically sampled video signal comprising signal samples which form a sequence of radar recurrences, each radar recurrence corresponding to echo signals received in response to a transmitted radar pulse signal, and
   obtaining the projection ($D_s$) of said range (D) on a plane that passes through said moving object by temporally repositioning the sample of each radar recurrence to form a corresponding corrected recurrence, each corrected recurrence having a sampling frequency ($H_e$) and duration identical to that of said corresponding uncorrected radar recurrence.

2. The method of claim 1 wherein the number of samples of each corrected recurrence is equal to that of the corresponding radar recurrence.

3. The method of claim 1 wherein said radar is located on a tower and said projection is projection on the ground and wherein said repositioning step comprises the steps of:
   in a first time zone (I) of each radar recurrence extending substantially from zero to H samples, wherein H is the height of the tower expressed in samples, eliminating all samples,
   in a second time zone (II) of each radar recurrence extending substantially from H to $H^2$ samples, temporally repositioning the samples of the radar recurrence so that the distance to which they correspond is the desired projection, and
   in a third time zone (III) of each radar recurrence extending substantially from $H^2$ samples to the end of the recurrence, positioning the samples sequentially and at the sampling frequency.

4. The method of claim 3 wherein the corrected recurrence is delayed with respect to the corresponding radar recurrence by a duration equal to that of said first zone.

5. The method of claim 4 wherein said radar provides a synchronizing signal ($SY_r$) which synchronizing signal is delayed by a duration equal to said first zone to form a corrected synchronizing signal ($SY_c$).

6. The method of claim 3 wherein the repositioned samples of said second zone are multiplied by a factor ($P_E$), whereby the number samples created by the multiplication compensates for samples not accounted for in said first zone.

7. A device for providing a slant range correction for a radar mounted on a tower comprising
   means for providing from said radar a sampled video signal comprising samples which form a radar recurrence, said radar recurrence comprising first, second, and third time zones, said first zone extending from zero to H samples where H corresponds to the height of the tower measured in samples, said second zone extending from H samples to $H^2$ samples, and said third zone extending from $H^2$ samples to the end of the recurrence,
   memory means for selectively storing said samples of said radar recurrence,
   means for generating a first signal having a frequency $H_E$ for writing the samples of said radar recurrence into said memory means, said first signal inhibiting the writing of said samples during the first time zone of said radar recurrence,
   means for generating a second signal having a frequency $H_L$ for the reading of said samples from said memory means, said second signal serving to read samples in the second time zone of said radar recurrence with a frequency $H_L$ that differs from the frequency $H_E$ of said first signal by a multiplication factor $P_E$, said samples read in said second zone being multiplied by said factor $P_E$, said second signal also serving to read samples in said third zone of said recurrence from said memory means at a frequency which is equal to the frequency $H_E$ of the first signal, and
   means for transmitting signals read from said memory means at a sampling frequency $H_E$.

8. The device of claim 7 further comprising means for converting said samples of said recurrence to parallel form before transmission to said memory means, and means for converting said samples into serial form at an output of said memory means.

9. The device of claim 7 wherein said means for generating said second signal comprises memory means for storing said multiplication factor $P_E$.

10. The device of claim 9 wherein said memory means for storing said multiplication factor $P_E$ is adapted to achieve parallelization by a factor Q.

* * * * *